United States Patent Office 3,296,597
Patented Jan. 3, 1967

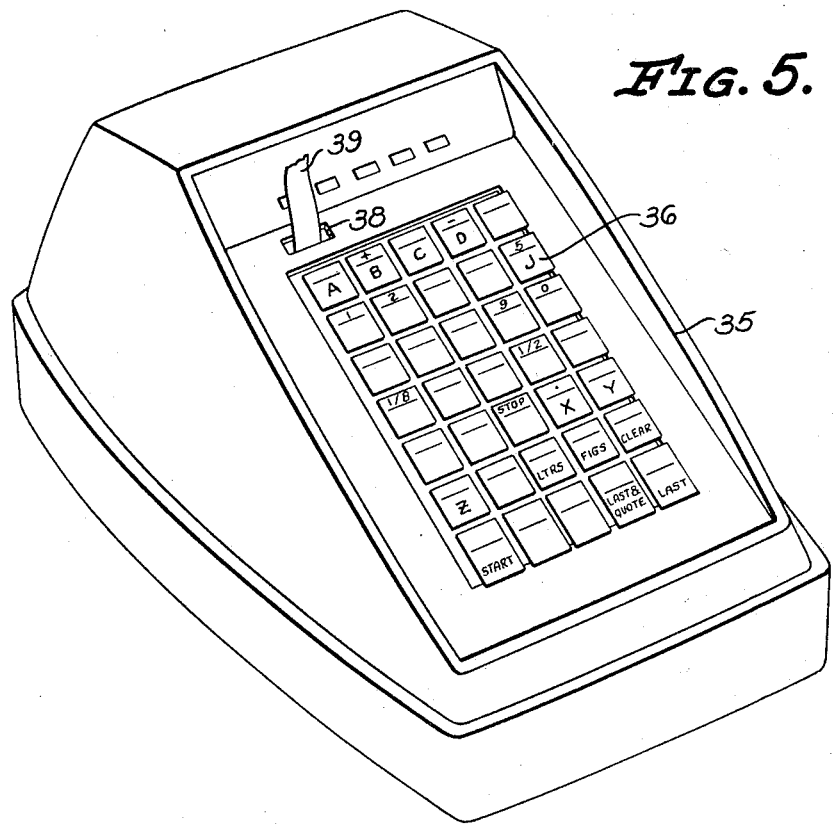

3,296,597
MARKET QUOTATION APPARATUS
John R. Scantlin, Los Angeles, Evan J. Drummond, Woodland Hills, Michael T. Gray, Los Angeles, and Reaman Paul Niquette, Palos Verdes Estates, Calif., assignors to Scantlin Electronics, Inc., Los Angeles, Calif., a Delaware corporation
Filed Oct. 28, 1963, Ser. No. 319,231
19 Claims. (Cl. 340—172.5)

This invention relates to market quotation equipment and, in particular, to apparatus for providing specific information on specific goods to a remotely located customer in response to specific inquiries of the customer. The apparatus can be used to provide any type of information desired by the customer and will be described herein as used for stocks traded on the New York Stock Exchange. A typical installation will include a range of information on securities traded on the New York and American Exchanges and similar information on a wide range of over-the-counter stocks. The installations may also incorporate data on various commodity markets. The apparatus is not limited to providing price data and can incorporate any desired data. The equipment currently in use is programmed to provide the following on each listed security—last sale, net change from previous close, up or down change from previous sale, previous close if stock not opened, opening price, high and low for the day, cumulative volume, bid and ask quotes, ex dividend identification, flash price, dividend rate, dividend yield at current price, earnings, price-earnings ratio at current price. The equipment also provides market averages, lists of most active stocks and hourly exchange volumes.

It should be noted that all of the information provided by the apparatus may be obtained directly from the various markets or is calculated from the data obtained from the markets and is ordinarily available in the newspapers at the end of the business day. The important feature of the present equipment lies in the fact that at any time during the business day, each customer can have an immediate answer to his own particular inquiry and can obtain information on the status of a particular security at the time of the inquiry.

In the market quotation apparatus of the invention each customer is connected to a market data center by special equipment and conventional transmission lines which provide for transmission of customer inquiries to the data center and for transmission of messages from the data center to the customer in response to the inquiries. In such an arrangement, the transmission line charges are a major cost item and hence line sharing is dictated. It is an object of the present invention to provide a new and novel apparatus for interconnecting a large number of customers with a market data center and to provide for immediate service for each customer with a minimum of transmission lines.

It is an object of the invention to provide a market quotation apparatus including a memory unit having means for storing market information therein, a computer including means for looking up stored information in the memory unit and composing a message in response to an inquiry, a customer unit including means for generating an inquiry and means for displaying a message, a regional buffer having a plurality of customer inputs and outputs and a high speed line input and output, means for connecting the customer unit to the corresponding input and output of the regional buffer for transmitting inquiries to the regional buffer and messages to the customer unit, a computer buffer having a plurality of high speed line inputs and outputs and a computer input and output for connection to the computer, and means for connecting the regional buffer to the corresponding input and output of the computer buffer for transmitting inquiries to the computer buffer and messages to the regional buffer.

A particular object is to provide such an apparatus wherein each of a plurality of customer units is connected to an adjacent regional buffer by a relatively low speed and inexpensive telegraph line. A further object is to provide such an apparatus wherein each of a plurality of regional buffers is connected to the remotely located computer and memory unit by a high speed data transmission line, which lines are relatively expensive. A particular object is to provide such an apparatus wherein a pair of regional buffers may be connected back to back to provide a link between the data center and a third regional buffer and also to provide for connection of a plurality of customers at the back-to-back pair of regional buffers.

It is a particular object of the invention to provide a market quotation apparatus which may utilize any of the conventional input generating devices at the customer unit for generating the inquiry, typically a keyboard or dial. Another object is to provide such a market quotation apparatus which may utilize any of the conventional display means for presenting the message to the customer, such as a typewriter, high speed printer, cathode ray tube, a plurality of character lamps, and the like.

The invention also comprises novel details of construction and novel combinations and arrangements of parts, which will more fully appear in the course of the following description. The drawings merely show and the description merely describes a preferred embodiment of the present invention which is given by way of illustration or example.

In the drawings:

FIG. 5 is a perspective view of a preferred embodiment of the customer's desk unit; and FIG. 6 illustrates a typical message on the printed paper tape produced by the desk unit of FIG. 5.

Figure 1:
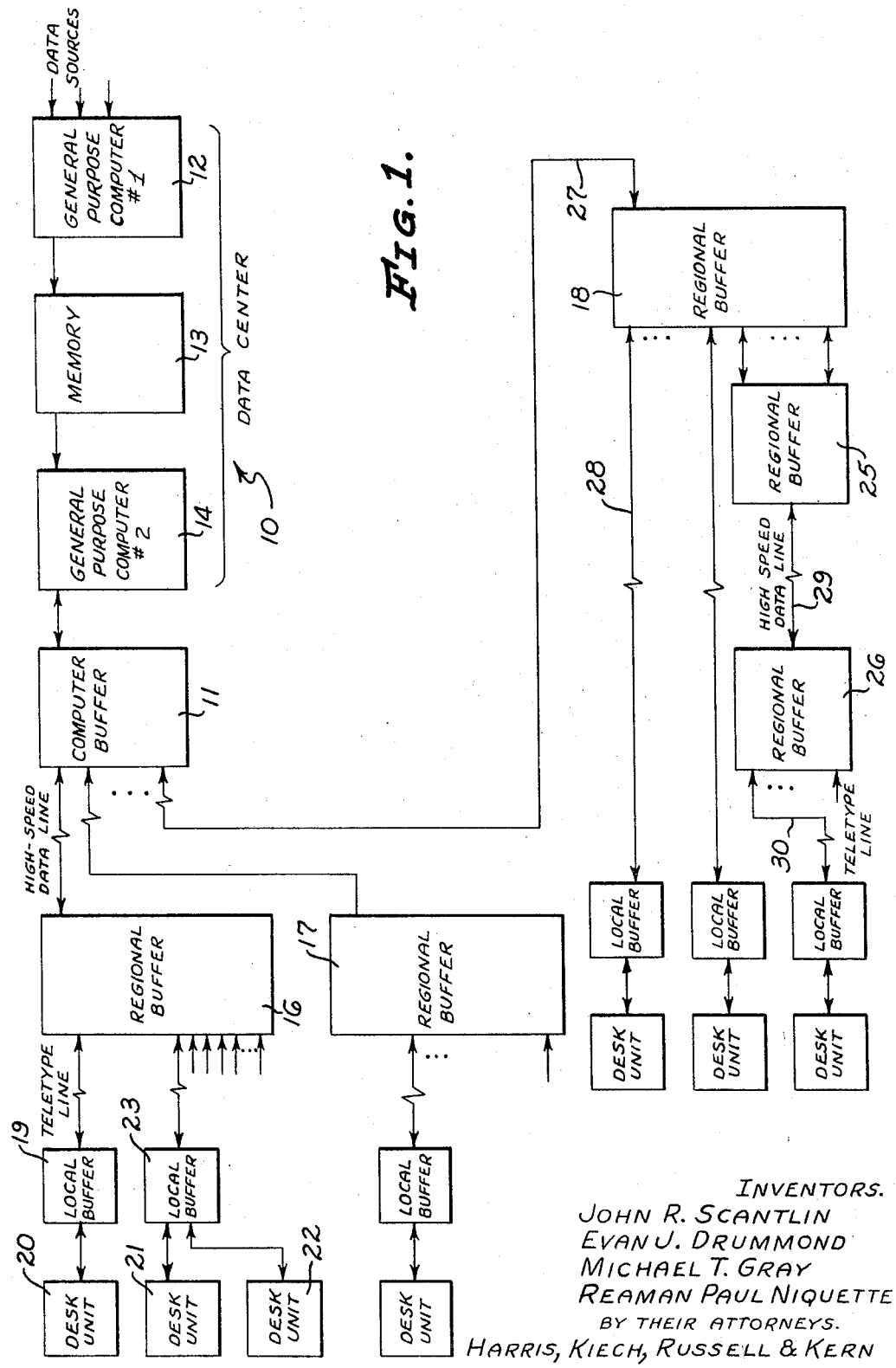
FIG. 1 is a block diagram illustrating the overall apparatus.

Referring now to FIG. 1, a data center 10 and a computer buffer 11 are located at a spot adjacent the data sources, typically at or near New York City. The data center may comprise a general purpose computer 12, a memory 13 and a second general purpose computer 14. Data from the various markets and other sources are provided as inputs to the computer 12, which is programmed to handle the incoming data, select that which is desired, perform various calculations, and transfer the resultant information to the memory 13.

As an example, suppose 100 shares of General Motors was sold at 57. This information is transferred from the New York Stock Exchange to the computer 12. The computer will check in the memory 13 and determine that the previous last sale was at 56¾. The computer will store a new last sale figure of 57 in the memory for GM and will also store an up signal in the tick from previous sale location of the memory. The computer will check to determine the high for the day for GM stored in the memory 13 and if less than 57, will change the figure to 57. The computer will also extract the cumulative volume for GM from the memory, add 100 to this figure, and reinsert it in the memory. By this means, the data stored in the memory is continuously maintained current.

The second computer 14 is programmed to receive an inquiry from a customer, extract from the memory 13 the information necessary to respond to the inquiry, and transmit the message in response to the inquiry.

Conventional commercial equipment may be used for the computers 12, 14 and the memory 13 and the details of construction and operation of these components will not be given herein. In the preferred form of the invention disclosed herein, the computer 12 may be a CDC160A computer, the memory may be a CDC169-3 memory, and the computer 14 may be another CDC160A computer. It should be noted that the function of the computer 12 may be performed partly or totally by human operators who read the incoming data, check the contents of the memory, and compose the information to be substituted into the memory.

The computer buffer 11 is positioned adjacent the computer 14 and is connected thereto by a line 15. The apparatus includes a plurality of regional buffers 16, 17, 18, each connected to the computer buffer 11 by a high speed data line. A regional buffer is installed at a location adjacent a plurality of customers, typically at a major city. The particular apparatus described herein will provide for up to eight regional buffers directly connected to the computer buffer. Of course, the invention is not limited to this particular number of units and fewer or more regional buffers may be utilized.

A plurality of customers are connected to each regional buffer, with each customer being served by a separate Teletype or telegraph line. Each customer is provided with a local buffer 19 and a desk unit 20. A plurality of desk units may be operated from a single local buffer, as indicated at 21–23. In the particular apparatus described herein, each regional buffer can have up to 128 Teletype line inputs which are used to serve up to 126 customers, two inputs being reserved. Of course, the equipment may be designed to serve fewer or more customers as desired.

In regions where all of the customer lines of a regional buffer are not used locally, another regional buffer 25 may be connected back to back with a regional buffer 18 over certain of the customer inputs, with the buffer 25 connected to a remotely positioned regional buffer 26 via a high speed data line. Additional customers will then be served from the buffer 26. As an example, suppose the regional buffers 18 and 25 are positioned at Pittsburgh and the regional buffer 26 at Cincinnati. The buffer 18 may be connected to the computer buffer 11 at New York by the high speed line 27 and a quantity of customers, say 50, can be served in Pittsburgh from the regional buffer 18 via the Teletype lines such as the line 28. Another group of customer inputs of the regional buffer 18 may be directly connected to the corresponding customer inputs of the buffer 25 which buffer is then connected to the buffer 26 via the high speed line 29. Then additional customers may be served locally at Cincinnati via the telegraph lines, such as the line 30.

The flow of information from a customer to the data center and from the data center to the customer will be described in conjunction with FIGS. 2, 3 and 4. Each customer is provided with a desk unit 35 (FIG. 5) which is manually actuated by the customer to generate the inquiry. Each desk unit includes a plurality of manually actuable push buttons 36, some lights 37 which indicate when a particular desk unit is in use, and a paper tape outlet 38 at which a printed tape 39 appears carrying the message in response to the customer's inquiry. A printer suitable for use in the apparatus to make the paper tape message is shown in U.S. Patent No. 3,064,545.

A request for information is initiated by pressing buttons in sequence on the desk unit. Each button pushed results in information which is sent to the computer as a separate character. Every character is treated separately through the system for both directions of transmission. No storage substantially greater than one character is required in the system except as is provided as part of the program in the computer 14.

As each button on the desk console is pressed, a five-bit character is encoded and sent to the local buffer or desk unit converter, in parallel form and is temporarily stored in a shift register. Upon receipt of the parallel information in the desk unit converter, a timing sequence is begun to shift the information out in serial form at a 100 words per minute data rate to the local central office or regional buffer via a standard unipolar telegraph line. The receiving portion of the desk unit converter simultaneously receives the character being sent and provides signals for the desk unit to cause the character to be printed.

When the character arrives at the local central office, it is temporarily stored in the customer's module. A separate circuit in the customer's module notifies the scanner of the regional buffer that a complete character has arrived as the scanner sweeps over the plurality of customers' modules looking for waiting characters. There may be up to 126 customers' modules in each regional buffer, each customer's module having a seven-bit binary address representing numerically customers 1, 2, 3, . . . 126. The scanner is a 128 count device with one address reserved for the empty word code and a second address reserved for future use.

When the scanner finds a waiting character in a customer module, a word is automatically set up for transmission to the computer buffer. The word consists of twelve bits and is divided into two parts or fields. The address field is transmitted first and consists of the seven-bit binary address of the customer. The character field follows and consists of the five bits which have been temporarily stored in the customer's module. The completed word is transmitted at a rate of 2000 bits per second on the high speed data line to the computer buffer, with one word for each button pressed by the customer at the desk unit. At the end of every sixteenth word, a distinctive synchronizing code referred to as the frame code, is put on the transmission line to assist the computer buffer equipment in separating the words.

When the word arrives at the computer buffer, it is again temporarily stored in a line module. In the specific embodiment illustrated, there are eight input lines to the computer buffer. The incoming character from a particular line is held in temporary storage in hopes that a character will also arrive on another line. After the characters are held for the longest possible time, the computer is interrupted and the computer prepares itself to receive input. On demand of the computer, the words from the eight lines are given to the computer. The customers on a line are identified by their individual seven-bit number address and the lines are identified by their order of input. When the character arrives in the computer, it is examined and placed in a specific location in the computer memory reserved for that particular customer. This process is repeated until the entry of symbols is complete. The entry routine always ends with the pressing of a function button which defines the type of service or information desired. When the computer receives a code corresponding to one of these function buttons, it proceeds to look up the information desired and prepare an answer. For example, when a customer desires the last price of General Motors, he composes a three-character inquiry comprising the character G, the character M, and a character corresponding to the function last price. The inquiry composition is achieved by pressing the push button identified by the letter G, then the push button identified by the letter M, and then the push button marked last price, the characters G and M comprising the identification section of the inquiry and the third character comprising the function section. On receipt of this complete inquiry, the computer 14 will go to that portion of the memory 13 in which the last price of GM is stored and provide this data as the message to be returned to the customer.

The return information comprising the message follows the same path as the input information. On command of the computer interface equipment, the computer outputs twelve-bit words containing customers' addresses and characters. These words are interspersed with the synchronizing or frame code and sent out on the appropriate high speed line.

The local central office or regional buffer equipment synchronizes with the incoming information so as to separate it into words. The address portion of each word is decoded and used to select the correct customer's module. The character portion of each word is shifted to a buffer in the customer's module and sent to the desk unit converter via the same telegraph line that was used for the inquiry characters.

When the character is received at the desk unit converter, it is stored in a receive register. At the end of the character the information is transferred in parallel to another register. The information comprising the character is then transferred to a final register which is operated as the counter of the printer, the operation of which is described in the aforementioned U.S. Patent No. 3,064,545.

As described above, information is transmitted on the high speed data lines in twelve-bit words, each word comprising a seven-bit address and a five-bit character. If no inquiry or message is waiting during a particular word time, an empty word is transmitted. An empty word consists of an all-zero address and the character V, the zero address being restricted from use by the scanner for customers' modules, as indicated previously. The ones in the empty word character serve to break up the bit pattern thereby preventing long chains of all zeroes on the transmission line during idle conditions. Words are transmitted in groups called frames, each frame comprising sixteen words plus an eight-bit frame code providing a total of two hundred bits in each frame. The frame code serves as a synchronizing code. At 2000 bits per second on the high speed line, a frame requires 0.1 second transmission time. The various figures given above have been selected for use in the equipment now in service but it should be kept in mind that these particular figures are arbitrary and that the invention may be utilized with other arrangements.

Figure 2:
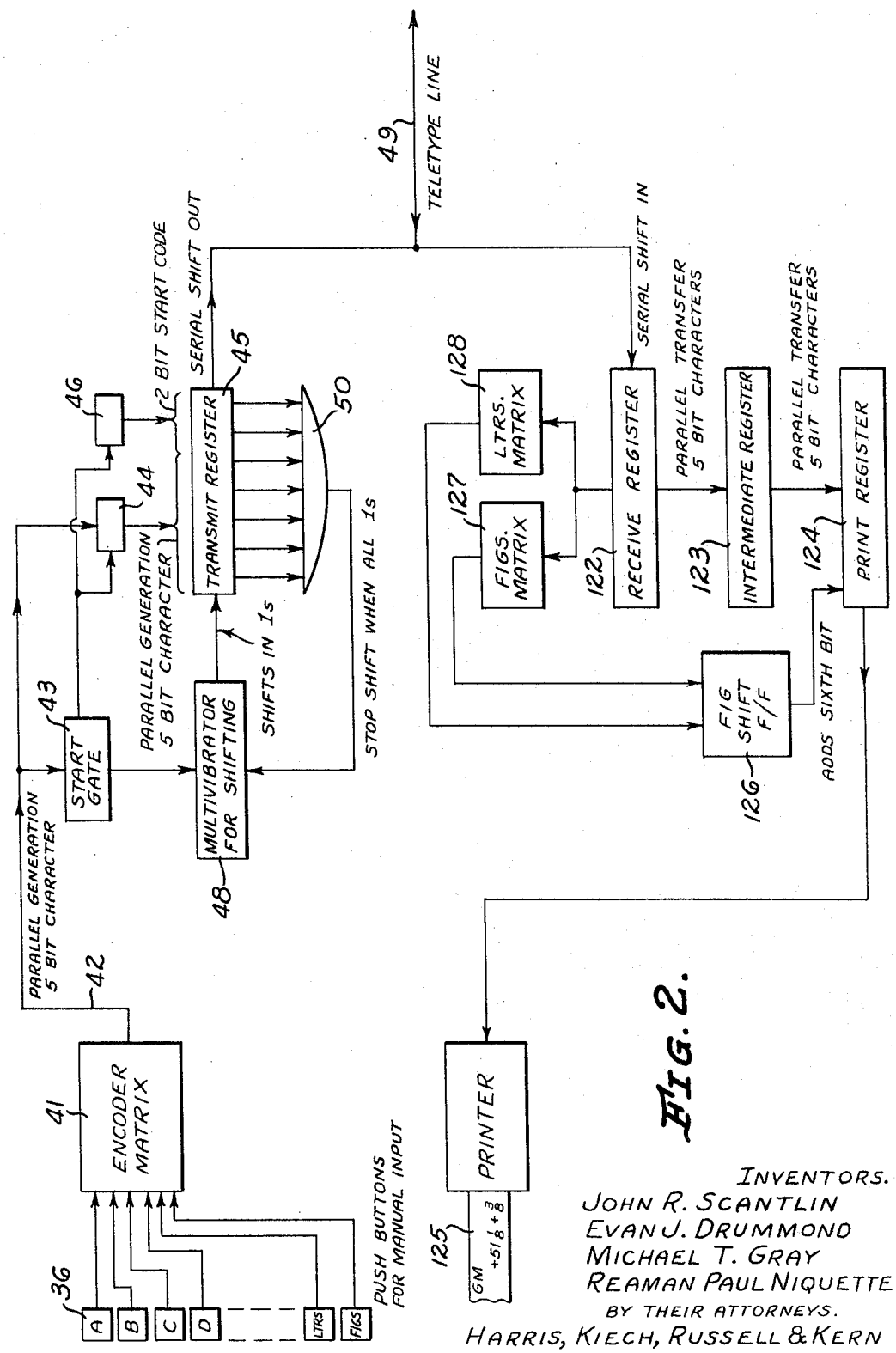
FIG. 2 is a diagram of a customer unit.

Referring to FIG. 2, depression of one of the push buttons 36 of the desk unit connects a particular point in an encoder matrix 41 to circuit ground generating a parallel five-bit character on line 42. Generation of the five-bit character on the line 42 actuates a start gate 43 which in turn actuates another gate 44 to transfer the five-bit code to five stages of a transmit register 45 and gate 46 to set a predetermined two-bit start code in the first two stages of the register 45. In the convention used in the present system, the start code is a one followed by a zero.

The start gate 43 also energizes a multivibrator 48 which provides the shift pulses for shifting the information serially out of the register 45 onto the Teletype line 49. Shifting is accomplished by setting in ones at the input end of the register. Each stage of the register is also connected to a seven-input AND gate 50 which generates a stop control for the multivibrator when all seven stages of the register 45 are ones. The transmitting section of the local buffer is now ready for actuation of another push button at the keyboard by the customer.

As seen in FIG. 5, the keyboard of the desk unit is provided with a figure shift and a letter shift so that two different characters can be generated with a single keyboard button in a manner analogous to that of a standard typewriter. The device is ordinarily in the letters shift mode and a first condition exists in the encoder matrix. When it is desired to transmit figures or other upper case symbols, the figure shift button is depressed setting the encoder matrix to a second condition. The device is then returned to the letters mode by depressing the letters shift button.

Figure 3:
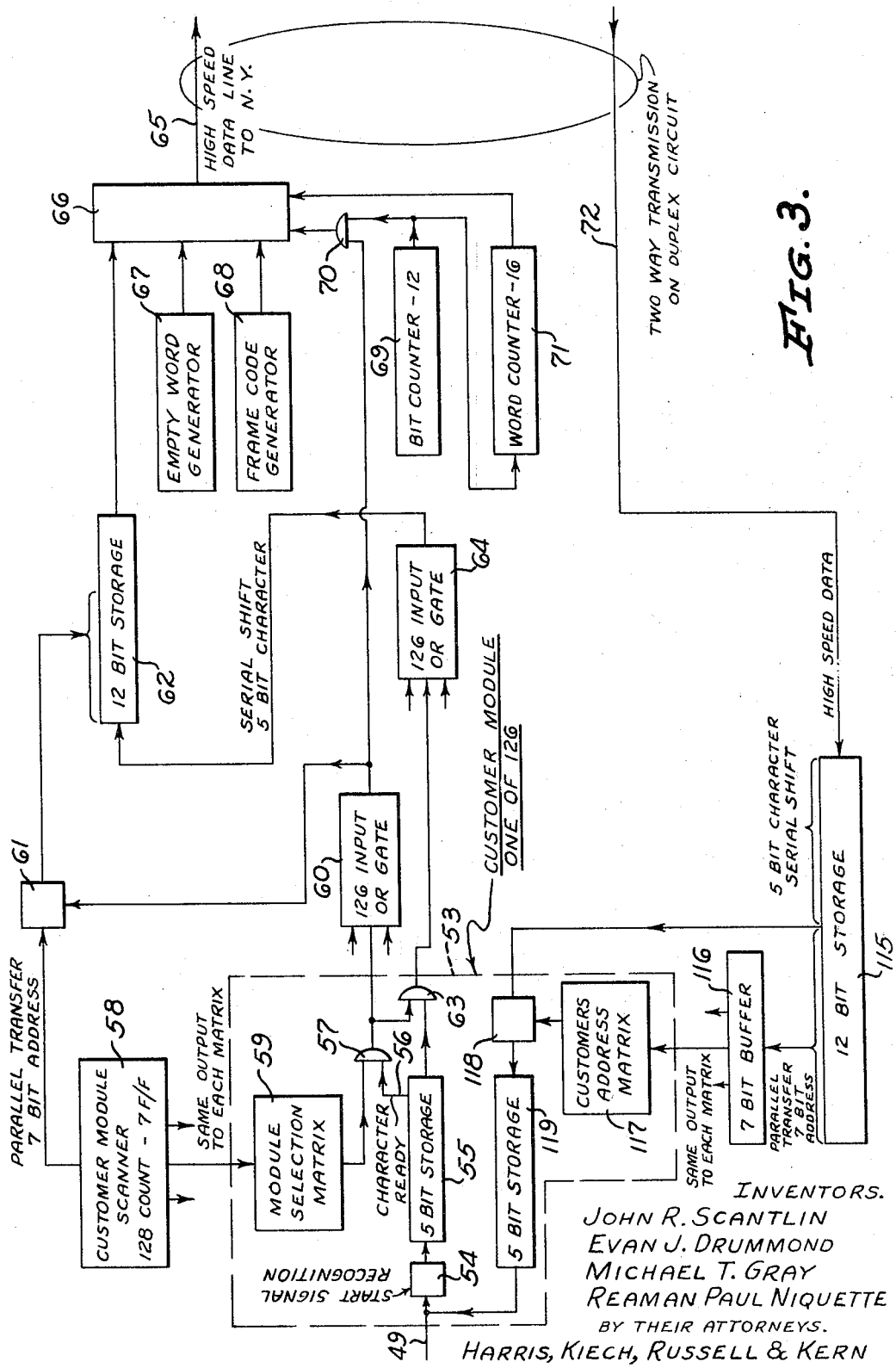
FIG. 3 is a diagram of a regional buffer.

Next consider FIG. 3, a regional buffer which has a customer module 53 for each customer served by the regional buffer. Information arrives on the Teletype line 49 entering a start signal recognition gate 54 and a five-bit storage register 55. When the start code is received at the gate 54, a five-bit shift sequence is initiated for shifting the register 55 five times at the transmission rate of the local buffer to establish the five-bit character in the register 55. When the five-bit character is stored in the register 55, a character ready signal is generated on the line 56 as an input to an AND gate 57.

A customer module scanner 58 comprising seven flip flops which count 0 through 127 provides an input to the module selection matrix 59 of each customer module. A scanner counter corresponding to the seven-bit address of a particular customer module produces an output from the selection matrix of that module for the AND gate 57. Coincidence of inputs at the gate 57 provides a strobe signal through an OR gate 60 to a transfer gate 61 for transferring the seven-bit address from the scanner to seven stages of a twelve-bit storage unit 62. The output from the AND gate 57 also provides an input to an AND gate 63 for serial shifting of the five bits in the register 55 through an OR gate 64 to the register 62. The scanner 58 provides the inputs for each of the module selection matrices and also generates the address for each inquiry word. As indicated previously, each word comprises a seven-bit address and a five-bit character. Each of the 126 customer modules is connected to the OR gates 60 and 64 so that characters are sent from each customer in sequence. If there is no character ready in a particular customer module, the scanner moves on to the next module having a character ready.

It should be noted that while the twelve-bit word in the storage register 62 has been formed by a parallel transfer of the seven-bit address followed by a serial shift of the five-bit character, the word may be composed by all parallel transfer, all serial shift, or various combinations.

As indicated previously, information on the high speed data line 65 is sent in frames, each comprising sixteen twelve-bit words and an eight-bit frame code. The twelve-bit words are serially shifted from the storage register 62 onto the line via switching logic 66. When there is no word ready for transmission from a customer, the twelve-bit empty word is produced at the empty word generator 67 for transmission on the line. At the end of the sixteenth word, the eight-bit frame code comprising seven ones and a zero is generated at the frame code generator 68 for transmission on the line. A bit counter 69 provides a word signal at the end of each twelve counts, which word signal is combined with the output from the gate 57 at an AND gate 70. When there is a character ready for transmission at the end of the twelve count, the gate 70 provides a control signal for connecting the register 62 to the line 65. If there is no character ready at this time, the generator 67 provides the output to the line 65. A word counter 71 provides a frame signal at the end of the sixteenth word to switch the frame code generator 68 onto the line 65 in place of the register 62 and generator 67.

Figure 4:
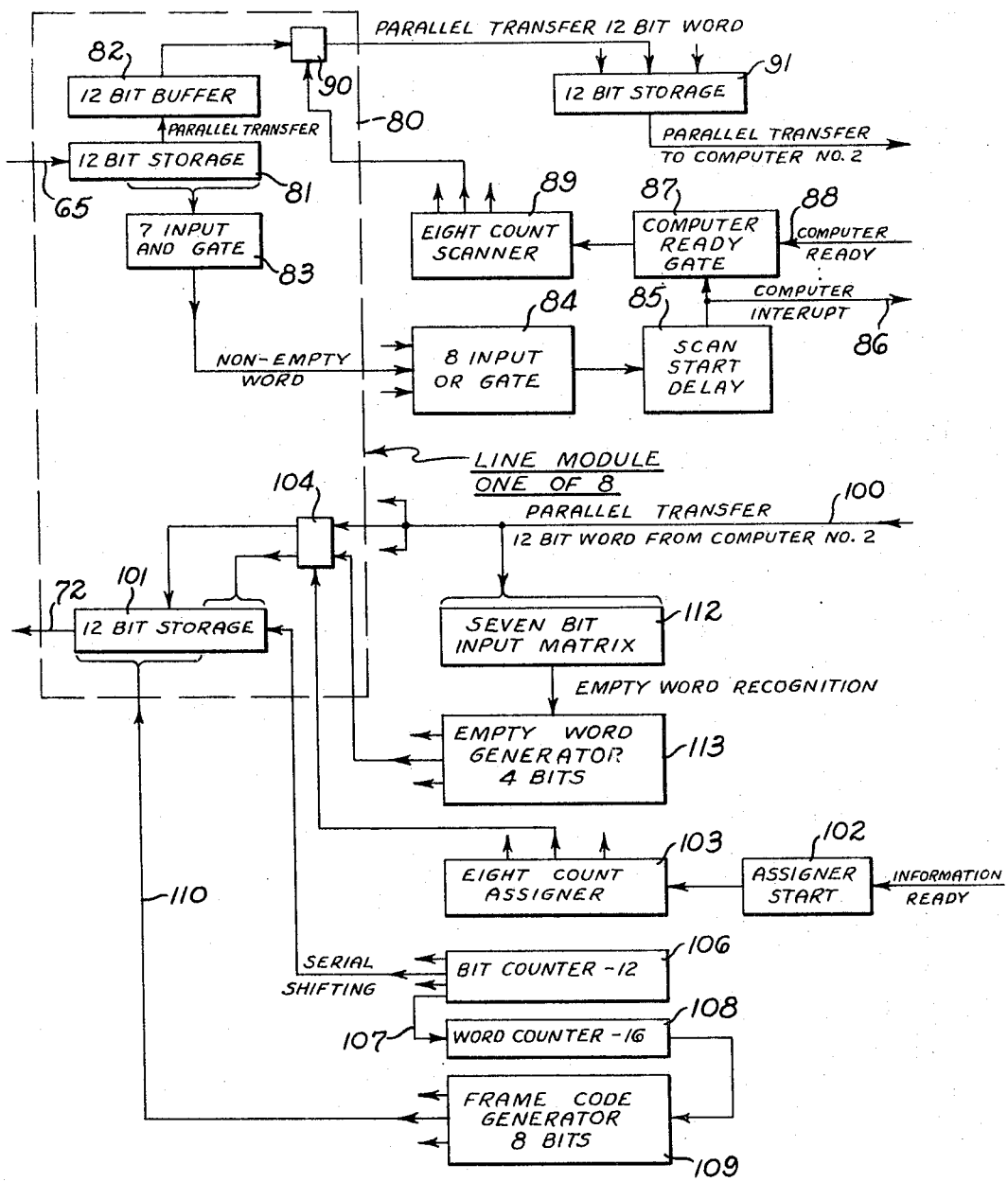
FIG. 4 is a diagram of the computer buffer.

The high speed data line to New York 65 and the high speed data line from New York 72 are indicated on FIGS. 3 and 4 as two separate lines, since information is transmitted both to and from New York at the same time. In actual practice, the telephone company which operates the high speed data lines provides for full duplex operation of the circuit.

Referring now to FIG. 4, the interface or computer buffer has eight line modules 80, each module having a twelve-bit shift register 81 for receiving and storing an incoming word from the corresponding high speed data line 65. After receipt of the twelfth bit of the word, the entire word is parallel shifted to a twelve-bit buffer register 82. The first seven bits of the word provide an input to an AND gate 83 which gate provides an output signal if the address of the word in the register 81 is other than that of an empty word. The output of the AND gate 83 of each line module is connected as an input to an OR gate 84, the output of which is connected as an input to the scan start delay 85.

After transfer of a nonempty word to the buffer register 82, a twelve-bit time delay can be accommodated before the register 82 has to be emptied to receive the next twelve-bit word on the high speed line. After receipt of a first nonempty word signal, the scan start delay delays transmission of this signal for a portion of the twelve-bit time period in order to permit other line modules to receive and temporarily store a nonempty word prior to interrupting the computer operation for inputting words to the computer. At the end of the delay period, the scan start delay provides an interrupt signal to the computer on line 86 and also an input signal to the computer ready gate 87. On receipt of the computer interrupt signal, the computer, pursuant to its program, changes its mode of operation to that of receiving information from the computer buffer and provides a computer ready signal on line 88 to the gate 87. The output of the gate 87 initiates an eight-count cycle of the scanner 89 which sequentially strobes a transfer gate 90 in each line module for shifting words from the buffer 82 of each module to another buffer 91 from which the information is transferred to the computer input.

The transmission of a character from the desk unit to the computer as described above is repeated each time the customer depresses a button on his desk unit with the inquiry being transmitted a character at a time as it is composed from the desk unit to the computer until the complete inquiry is stored in the computer. After the message in response to the inquiry is prepared by the computer, the message is transmitted a character at a time back to the desk unit for display. As indicated previously, information is transmitted in both directions simultaneously between the regional buffers and the computer buffer and is transmitted only in one direction at a time between a customer local buffer and the associated regional buffer.

Referring again to FIG. 4, twelve-bit words are transferred from the computer output channel on line 100 to a twelve-bit storage register 101 in each line module. An information ready signal from the computer actuates an assigner start unit 102 for energizing an eight-count assigner 103 which sequentially energizes a transfer gate 104 in each of the line modules for directing the information on the line 100 to each of the storage registers 101 in sequence.

Serial shifting pulses for the storage register 101 of each module are provided by a bit counter 106 which also provides an input on line 107 to a word counter 108 at the end of each word. Following the sixteenth word, the word counter provides a frame code signal to a frame code generator 109 which sets the eight-bit frame code in the register 101 via line 110.

Empty words from the computer normally comprise twelve zeroes. In order to have some ones on the high speed line during idle conditions, means are provided for generating a particular empty word code which is the same as is used with the inquiry transmission equipment, namely, a seven-zero address and a one-zero and four-one character code. The first seven bits on the line 100 are connected as an input to a matrix 112 which provides an output to the empty word generator 113 when all seven inputs are zeroes. The generator 113 provides four ones for the last four stages of the twelve-bit register 101, the generator output also being controlled by the assigner via the transfer gate 104.

Referring now to FIG. 3, information on the high speed line 72 is serially input into a twelve-bit storage register 115. At the end of the word, the first seven bits comprising the address are parallel transferred to a buffer register 116. The seven stages of the register 116 are fed as inputs to a customer address matrix 117 in each of the customer modules. The last five bits from the storage register 115 are serially shifted by the incoming pulses on the line 72 through a selected transfer gate 118 into a five-bit storage register 119 of the appropriate customer module. If the word in the register 115 is an empty word, there will be no customer address matrix corresponding to the seven-zero address code and the five-bit character of the empty word will be discarded.

The five-bit character in the register 119 of the customer module is then transmitted on the Teletype line 49 back to the customer unit at the much slower rate of the Teletype line. Because of the relatively slow operating time of the display unit as compared to the transmission rate of the high speed data line, characters comprising a message for a specific customer are sent only one character per frame so that the character can be routed through the regional buffer to the local buffer and into the printer storage register before the next character is transmitted and catches up.

Referring now to FIG. 2, it should be noted that the output from the transmit register 45 onto the line 49 is also connected as an input to a receive register 122 so that each character of the inquiry is also transmitted to the display printer. When the start bit of a character has been shifted all the way through the register 122, the character is parallel transferred from the register 122 to the register 123. If the print register 124 is empty, the five-bit character is then parallel transferred from the register 123 to the register 124 and the printing operation is initiated. The operation of the printer is described in detail in the aforementioned U.S. Patent No. 3,064,545. The intermediate register 123 of FIG. 2 corresponds to the register 40 of the patent and the print register 124 corresponds to the register and counter 36 of the patent. The output of the printer is a paper tape 125 with the characters thereon and a typical message tape is shown in FIG. 6. The function characters of the push buttons are transferred from the transmit register 45 to the receive register 122 and onto the printer. However, there are no characters on the printing wheel itself corresponding to these function codes and hence the function character of an inquiry does not appear on the printer output.

After the identification section of the inquiry has been printed, the characters comprising the message from the computer arrive one at a time on the line 49 and are shifted through the registers 122, 123 and 124 in the same manner as the inquiry characters. The particular printer used in the system now in operation operates with a six-bit character code so that both the upper case and lower case characters of the desk unit can be printed separately. The print register 124 is a six-bit register with the latter five stages being supplied from the intermediate register 123. The first stage is set from a figure shift flip flop 126 which in turn is controlled from a figures matrix 127 and a letters matrix 128. When figures or upper case characters are to be transmitted as a portion of an inquiry or as a portion of a message, they are always preceded by the figures shift function character. This particular five-bit code is recognized by the figures matrix 127 which has the five stages of the register 122 as an input. On receipt of a figures shift character code, the flip flop 126 is actuated to set a particular state in the first stage of the register 124. Similarly, when a letters shift character code is received, the flip flop 126 is actuated to set the other state in the first stage of the register 124.

The character-by-character transmission from the computer to the printer is repeated until the complete message is received. Then the desk unit is ready for placing of another inquiry by the customer. Referring to the tape of FIG. 6, the meaning of each symbol is indicated below the symbol. This particular message is a GM full recap. The + sign tick indicates that the last price was up from the previous sale. The 51⅛ is the last price and the +⅜ is the net change of the last price from the previous day's close. B 51 indicates the most recent bid and the ¼ following the period indicates an asked of 51¼. Similarly, O, H, L and V provide the open, high and low prices and the volume for the day up to the present time. Shorter messages can be provided for lesser inquiries. An inquiry GM last provides only the tick, last and net change. Similarly a GM last and quote provides tick, last, net change, bid and asked. Flash prices and ex dividend stocks are identified by suitable symbols. As indicated previously, figures on dividends and earnings are available in response to appropriately worded inquiries. Also, current information on the general state of the market is available in response to inquiries.

Although an exemplary embodiment of the invention has been discussed and disclosed, it will be understood that other applications of the invention are possible and that the embodiment disclosed may be subjected to various changes, modifications and substitutions without necessarily departing from the spirit of the invention.

We claim as our invention:

1. In a market quotation apparatus, the combination of:
   a memory unit including means for storing market information therein;
   a computer including means for looking up stored information in said memory unit and composing a message in response to an inquiry, said inquiry including an identification section and a function section;
   a customer unit including means for generating an inquiry and means for displaying a message;
   a regional buffer having a plurality of customer inputs and outputs and a high speed line input and output;
   means for connecting said customer unit in parallel with additional customer units to the corresponding input and output of said regional buffer for transmitting inquiries to said regional buffer and messages to said customer unit;
   a computer buffer having a plurality of high speed line inputs and outputs and a computer input and output for connection to said computer; and
   means for connecting said regional buffer to the corresponding input and output of said computer buffer for transmitting inquiries to said computer buffer and messages to said regional buffer.

2. In a market quotation apparatus, the combination of:
   a memory unit including means for storing market information therein;
   a computer including means for looking up stored information in said memory unit and composing a message in response to an inquiry, said inquiry including an identification section and a function section;
   a plurality of customer units, each including means for generating an inquiry and means for displaying a message;
   a regional buffer having a plurality of customer inputs and outputs and a high speed line input and output;
   means for connecting each of said customer units in parallel with additional customer units to the corresponding input and output of said regional buffer for transmitting inquiries to said regional buffer and messages to said customer units;
   said regional buffer including a customer storage unit for each customer connected to the customer input for storing information received from a customer unit, with a digital address code for identifying the customer,
   transfer means for transferring information from a customer storage unit to the high speed line output, and
   a scanner for actuating said transfer means and comprising a digital counter for sequentially generating the address of each customer storage unit;
   a computer buffer having a plurality of high speed line inputs and outputs and a computer input and output for connection to said computer; and
   means for connecting said regional buffer to the corresponding input and output of said computer buffer for transmitting inquiries to said computer buffer and messages to said regional buffer.

3. In a market quotation apparatus, the combination of:
   a memory unit including means for storing market information therein;
   a computer including means for looking up stored information in said memory unit and composing a message in response to an inquiry, said inquiry including an identification section and a function section;
   a plurality of customer units, each including means for generating an inquiry one character at a time in a digital code and means for displaying a message;
   a regional buffer having a plurality of customer inputs and outputs and a high speed line input and output;
   means for connecting each of said customer units in parallel with additional customer units to the corresponding input and output of said regional buffer for transmitting inquiry characters one at a time to said regional buffer and messages to said customer units;
   said regional buffer including a customer storage unit for each customer connected to the customer input for storing an inquiry character received from a customer unit, with a digital address code for identifying the customer,
   an output storage unit,
   first transfer means for transferring an inquiry character from a customer storage unit to said output storage unit,
   second transfer means for transferring an address in code to said output storage unit to form an inquiry word comprising a character and an address,
   a scanner for actuating said first and second transfer means and comprising a digital counter for sequentially generating the address of each customer storage unit in a digital code, and
   third transfer means for transferring the inquiry word bit by bit to the high speed line output;
   a computer buffer having a plurality of high speed line inputs and outputs and a computer input and output for connection to said computer; and
   means for connecting said regional buffer to the corresponding input and output of said computer buffer for transmitting inquiry words to said computer buffer and messages to said regional buffer.

4. In a market quotation apparatus, the combination of:
   a memory unit including means for storing market information therein;
   a computer including means for looking up stored information in said memory unit and composing a message in response to an inquiry, said inquiry including an identification section and a function section;
   a plurality of customer units, each including means for generating an inquiry one character at a time in a digital code and means for displaying a message;
   a regional buffer having a plurality of customer inputs and outputs and a high speed line input and output;
   means for connecting each of said customer units in parallel with additional customer units to the corresponding input and output of said regional buffer for transmitting inquiry characters one at a time to said regional buffer and messages to said customer units;

said regional buffer including a first customer storage unit for each customer connected to the customer input for storing an inquiry character received from a customer unit, with a digital address code for identifying the customer, an output storage unit, first transfer means for transferring an inquiry character from a customer storage unit to said output storage unit, second transfer means for transferring an address in code to said output storage unit to form an inquiry word comprising a character and an address, a scanner for actuating said first and second transfer means and comprising a digital counter for sequentially generating the address of each customer storage unit in a digital code, third transfer means for transferring the inquiry word bit by bit to the high speed line output, an input storage unit for receiving message words bit by bit from the high speed line input, a second customer storage unit for each customer connected to the customer output for storing a message character received from said input storage unit, fourth transfer means for transferring a message character from said input storage unit to a selected one of said second customer storage units, and customer selection means having the message address of said input storage unit as an input for selecting one of said second customer storage units;

a computer buffer having a plurality of high speed line inputs and outputs and a computer input and output for connection to said computer; and means for connecting said regional buffer to the corresponding input and output of said computer buffer for transmitting inquiry words to said computer buffer and messages to said regional buffer.

5. In a market quotation apparatus having a memory unit adapted to receive and store stock market information, the combination of:

a plurality of customer units each having means for generating an inquiry for any selected portion of the said information and having means for displaying a message corresponding to said portion;

a regional buffer having a plurality of customer inputs and outputs for connection to each of said customer units in parallel and having a high speed line input and output;

a computer buffer connected to said high speed line;

a computer connected to said computer buffer and also connected to said memory unit;

customer address generating means included in said regional buffer for generating address identification codes corresponding to each of said customer units, said address and inquiry being communicated to said computer buffer by said high speed line output;

receiving means included in said computer buffer for communicating said address and inquiry to said computer;

inquiry response means included in said computer for looking up in said memory unit information corresponding to said inquiry, and for composing a message in response to said inquiry and communicating said message to said computer buffer, said message including the address of the customer;

means included in said computer buffer for receiving said message and communicating said message to said regional buffer through said high speed line input; and means included in said regional buffer for identifying said address and communicating said message to the proper customer unit for display thereof.

6. In a market quotation apparatus, the combination of:

a memory unit including means for storing market information therein;

a computer including means for looking up stored information in said memory unit and composing a message in response to an inquiry, said inquiry including an identification section and a function section;

a plurality of customer units, each including means for generating an inquiry one character at a time in a digital code and means for displaying a message;

a regional buffer having a plurality of customer inputs and outputs and a high speed line input and output;

means for connecting each of said customer units in parallel with additional customer units to the corresponding input and output of said regional buffer for transmitting inquiry characters one at a time to said regional buffer and messages to said customer units;

said regional buffer including a customer storage unit for each customer connected to the customer input for storing an inquiry character received from a customer unit, with a digital address code for identifying the customer, an output storage unit, first transfer means for transferring an inquiry character from a customer storage unit to said output storage unit, second transfer means for transferring an address in code to said output storage unit to form an inquiry word comprising a character and an address, a scanner for actuating said first and second transfer means and comprising a digital counter for sequentially generating the address of each customer storage unit in a digital code, third transfer means for transferring the inquiry word bit by bit to the high speed line output, means for counting a predetermined number of bits at the high speed line output to indicate the end of a word, means for counting a predetermined number of words at the high speed line output to indicate the end of a word group, means for generating a frame indicator in a digital code, and means for transferring said frame indicator bit by bit to the high speed line output at the end of a word group to form a transmission frame;

a computer buffer having a plurality of high speed line inputs and outputs and a computer input and output for connection to said computer; and means for connecting said regional buffer to the corresponding input and output of said computer buffer for transmitting inquiry words to said computer buffer and messages to said regional buffer.

7. In a market quotation apparatus, the combination of:

a memory unit including means for storing market information therein;

a computer including means for looking up stored information in said memory unit and composing a message in response to an inquiry, said inquiry including an identification section and a function section;

a plurality of customer units, each including means for generating an inquiry one character at a time in a digital code and means for displaying a message;

a regional buffer having a plurality of customer inputs and outputs and a high speed line input and output;

means for connecting each of said customer units in parallel with additional customer units to the corresponding input and output of said regional buffer for transmitting inquiry characters one at a time to said regional buffer and messages to said customer units;

said regional buffer including a customer storage unit for each customer connected to the customer input for storing an inquiry character received from a customer unit, with a digital address code for identifying the customer,
an output storage unit,
first transfer means for transferring an inquiry character from a customer storage unit to said output storage unit,
second transfer means for transferring an address in code to said output storage unit to form an inquiry word comprising a character and an address,
a scanner for actuating said first and second transfer means and comprising a digital counter for sequentially generating the address of each customer storage unit in a digital code,
third transfer means for transferring the inquiry word bit by bit to the high speed line output,
means for generating in a digital code an empty word having no customer's address, and
means for transferring said empty word bit by bit to the high speed line output at the end of a preceding word when there are no inquiry characters stored in said customer storage units;
a computer buffer having a plurality of high speed line inputs and outputs and a computer input and output for connection to said computer; and
means for connecting said regional buffer to the corresponding input and output of said computer buffer for transmitting inquiry words to said computer buffer and messages to said regional buffer.

8. In a market quotation apparatus, the combination of:
a memory unit including means for storing market information therein;
a computer including means for looking up stored information in said memory unit and composing a message in response to an inquiry, said inquiry including an identification section and a function section;
a plurality of customer units, each including means for generating an inquiry and means for displaying a message;
a plurality of regional buffers, each having a plurality of customer inputs and outputs and a high speed line input and output, and means for forming inquiries in computer word form;
means for connecting customer units in parallel to the corresponding input and output of each regional buffer for transmitting inquiries to said regional buffer and messages to said customer unit;
a computer buffer having a plurality of high speed line inputs and outputs and a computer input and output for connection to said computer; and
means for connecting each of said regional buffers to the corresponding input and output of said computer buffer for transmitting inquires to said computer buffer and messages to said regional buffer;
said computer buffer including a line storage unit for each regional buffer connected to the line input,
transfer means for transferring information from a line storage unit to the computer input, and
a scanner for actuating said transfer means for transferring from each of said line storage units after an inquiry word is stored in one of said line storage units.

9. In a market quotation apparatus, the combination of:
a memory unit including means for storing market information therein;
a computer including means for looking up stored information in said memory unit and composing a message in response to an inquiry, said inquiry including an identification section and a function section;
a plurality of customer units, each including means for generating an inquiry and means for displaying a message;
a plurality of regional buffers, each having a plurality of customer inputs and outputs and a high speed line input and output;
means for connecting customer units in parallel to the corresponding input and output of each regional buffer for transmitting inquiries to said regional buffer and messages to said customer unit;
a computer buffer having a plurality of high speed line inputs and outputs and a computer input and output for connection to said computer; and
means for connecting each of said regional buffers to the corresponding input and output of said computer buffer for transmitting inquiries to said computer buffer and messages to said regional buffer;
said regional buffer including means for forming inquiries in computer word form and means for generating in a digital code an empty word for transmission to said computer buffer when no inquiry words are awaiting transmission;
said computer buffer including a line storage unit for each regional buffer connected to the line input,
transfer means for transferring information from a line storage unit to the computer input,
control means having the address of the word in a line storage unit as an input for recognizing the presence of a non-empty word in a line storage unit and interrupting said computer after a nonempty word is recognized, and
a scanner for actuating said transfer means for transferring from each of said line storage units on command from said computer and said control means.

10. In a market quotation apparatus, the combination of:
a memory unit including means for storing market information therein;
a computer including means for looking up stored information in said memory unit and composing a message in response to an inquiry, said inquiry including an identification section and a function section;
a plurality of customer units, each including means for generating an inquiry and means for displaying a message;
a plurality of regional buffers, each having a plurality of customer inputs and outputs and a high speed line input and output;
means for connecting customer units in parallel to the corresponding input and output of each regional buffer for transmitting inquiries to said regional buffer and messages to said customer unit;
a computer buffer having a plurality of high speed line inputs and outputs and a computer input and output for connection to said computer; and
means for connecting each of said regional buffers to the corresponding input and output of said computer buffer for transmitting inquiries to said computer buffer and messages to said regional buffer;
said regional buffer including means for forming inquiries in computer word form and means for generating in a digital code an empty word for transmission to said computer buffer when no inquiry words are awaiting transmission;
said computer buffer including a line storage unit for each regional buffer connected to the line input for receiving and storing words bit by bit,
transfer means for transferring words in block form from a line storage unit to the computer input,
control means having the address of the word in a line storage unit as an input for recognizing the presence of a nonempty word in a line storage unit and generating a scanner start signal when a nonempty word is recognized,
delay means having said start signal as an input for interrupting said computer a predetermined period of time after said start signal is received, and a scanner for actuating said transfer means for transferring from each of said line storage units on command from said computer and said delay means.

11. In a market quotation apparatus, the combination of:
- a memory unit including means for storing market information therein;
- a computer including means for looking up stored information in said memory unit and composing a message in response to an inquiry, said inquiry including an identification section and a function section;
- a customer unit including means for generating an inquiry and means for displaying a message;
- first, second and third regional buffers, each having a plurality of customer inputs and outputs and a high speed line input and output, with the customer inputs and outputs of said second regional buffer connected to the corresponding customer outputs and inputs of said third regional buffer;
- means for connecting said customer unit in parallel with additional customer units to the corresponding input and output of said first regional buffer for transmitting inquiries to said regional buffer and messages to said customer unit;
- means for connecting the high speed line output and input of said first regional buffer to the high speed line input and output of said second regional buffer;
- a computer buffer having a plurality of high speed line inputs and outputs and a computer input and output for connection to said computer; and
- means for connecting the high speed line output and input of said third regional buffer to the corresponding input and output of said computer buffer for transmitting inquiries to said computer buffer and messages to said third regional buffer.

12. In a market quotation apparatus, the combination of:
- a memory unit including means for storing market information therein;
- a computer including means for looking up stored information in said memory unit and composing a message in response to an inquiry, said inquiry including an identification section and a function section;
- a plurality of customer units, each including means for generating an inquiry and means for displaying a message;
- a plurality of regional buffers, each having a plurality of customer inputs and outputs and a high speed line input and output;
- means for connecting customer units in parallel to the corresponding input and output of each regional buffer for transmitting inquiries to said regional buffer and messages to said customer unit;
- a computer buffer having a plurality of high speed line inputs and outputs and a computer input and output for connection to said computer; and
- means for connecting each of said regional buffers to the corresponding input and output of said computer buffer for transmitting inquiries to said computer buffer and messages to said regional buffer;
- said computer buffer including a line storage unit for each regional buffer connected to the line output,
- transfer means for transferring information from said computer input of said computer buffer to each of said line storage units, and
- a scanner for actuating said transfer means for transferring from said computer input to each of said line storage units in sequence.

13. In a market quotation apparatus, the combination of:
- a memory unit including means for storing market information therein;
- a computer including means for looking up stored information in said memory unit and composing a message in response to an inquiry, said inquiry including an identification section and a function section;
- a plurality of customer units, each including means for generating an inquiry and means for displaying a message;
- a plurality of regional buffers, each having a plurality of customer inputs and outputs and a high speed line input and output;
- means for connecting customer units in parallel to the corresponding input and output of each regional buffer for transmitting inquiries to said regional buffer and messages to said customer unit;
- a computer buffer having a plurality of high speed line inputs and outputs and a computer input and output for connection to said computer; and
- means for connecting each of said regional buffers to the corresponding input and output of said computer buffer for transmitting inquiries to said computer buffer and messages to said regional buffer;
- said computer buffer including a line storage unit for each regional buffer connected to the line output,
- first transfer means for transferring information in computer word form from said computer input of said computer buffer to each of said line storage units,
- a scanner for actuating said first transfer means for transferring from said computer input to each of said line storage units in sequence,
- second transfer means for transferring words bit by bit from a line storage unit to the corresponding high speed line output,
- means for counting a predetermined number of bits to indicate the end of a word,
- means for counting a predetermined number of words to indicate the end of a word group,
- means for generating a frame indicator in a digital code, and
- means for transferring said frame indicator bit by bit to each of the high speed line outputs at the end of a word group to form a transmission frame.

14. In a market quotation apparatus, the combination of:
- a memory unit including means for storing market information therein;
- a computer including means for looking up stored information in said memory unit and composing a message in response to an inquiry, said inquiry including an identification section and a function section;
- a plurality of customer units, each including means for generating an inquiry and means for displaying a message;
- a plurality of regional buffers, each having a plurality of customer inputs and outputs and a high speed line input and output;
- means for connecting customer units in parallel to the corresponding input and output of each regional buffer for transmitting inquiries to said regional buffer and messages to said customer unit;
- a computer buffer having a plurality of high speed line inputs and outputs and a computer input and output for connection to said computer; and
- means for connecting each of said regional buffers to the corresponding input and output of said computer buffer for transmitting inquiries to said computer buffer and messages to said regional buffer;
- said computer buffer including a line storage unit for each regional buffer connected to the line output,
- first transfer means for transferring information in computer word form including a customer address and a message character from said computer input of said computer buffer to each of said line storage units, a scanner for actuating said first transfer means for transferring from said computer input to each of said line storage units in sequence, detector means having the address of each computer word as an input for detecting the presence of an empty word having no customer's address, means for generating in digital code a particular message character, second transfer means actuated by said detector means for transferring said particular message character to a line storage unit when the word transferred thereto by said first transfer means is an empty word, third transfer means for transferring words bit by bit from a line storage unit to the corresponding high speed line output, means for counting a predetermined number of bits to indicate the end of a word, means for counting a predetermined number of words to indicate the end of a word group, means for generating a frame indicator in a digital code, and means for transferring said frame indicator bit by bit to each of the high speed line outputs at the end of a word group to form a transmission frame.

15. In a market quotation apparatus, the combination of:

a memory unit including means for storing market information therein;

a computer including means for looking up stored information in said memory unit and composing a message in response to an inquiry, said inquiry including an identification section and a function section;

a customer unit having an output and an input and means for generating an inquiry and means for displaying a message;

a regional buffer having a plurality of customer inputs and outputs and a high speed line input and output;

means for connecting said customer unit output and input in parallel with additional customer unit outputs and inputs to the corresponding input and output of said regional buffer for transmitting inquiries to said regional buffer and messages to said customer unit;

said customer unit including manually actuable means for generating in a digital code characters comprising an inquiry, a storage unit for storing each character, and transfer means for transferring a character bit by bit to said customer unit output;

a computer buffer having a plurality of high speed line inputs and outputs and a computer input and output for connection to said computer; and means for connecting said regional buffer to the corresponding input and output of said computer buffer for transmitting inquiries to said computer buffer and messages to said regional buffer.

16. In a market quotation apparatus, the combination of:

a memory unit including means for storing market information therein;

a computer including means for looking up stored information in said memory unit and composing a message in response to an inquiry, said inquiry including an identification section and a function section;

a customer unit having an output and an input and means for generating an inquiry and means for displaying a message;

a regional buffer having a plurality of customer inputs and outputs and a high speed line input and output;

means for connecting said customer unit output and input in parallel with additional customer unit outputs and inputs to the corresponding input and output of said regional buffer for transmitting inquiries to said regional buffer and messages to said customer unit;

said customer unit including a multibit storage unit for storing characters of an inquiry and having a first section and a second section, manually actuable means for generating characters in a digital code in said second section of said storage unit, means for generating in a digital code a regional buffer start signal in said first section of said storage unit, and transfer means for transferring said start signal and a character bit by bit to said customer unit output;

said regional buffer including means for recognizing said start signal;

a computer buffer having a plurality of high speed line inputs and outputs and a computer input and output for connection to said computer; and means for connecting said regional buffer to the corresponding input and output of said computer buffer for transmitting inquiries to said computer buffer and messages to said regional buffer.

17. In a market quotation apparatus, the combination of:

a memory unit including means for storing market information therein;

a computer including means for looking up stored information in said memory unit and composing a message in response to an inquiry, said inquiry including an identification section and a function section;

a customer unit having an output and an input and means for generating an inquiry and means for displaying a message;

a regional buffer having a plurality of customer inputs and outputs and a high speed line input and output;

means for connecting said customer unit output and input in parallel with additional customer unit outputs and inputs to the corresponding input and output of said regional buffer for transmitting inquiries to said regional buffer and messages to said customer unit;

said customer unit including a multibit storage unit comprising a shift register for storing characters of an inquiry and having a first section and a second section, manually actuable means for generating characters in a digital code in said second section of said register, first means for generating in a digital code a regional buffer start signal in said first section of said register, transfer means for transferring said start signal and a character bit by bit to said customer unit output and including second means for generating a series of digital bits of the same polarity as inputs for shifting said register, and an AND gate having as inputs the state of each stage of said first and second sections of said register and having an output for stopping said second generating means when all stages are of the same state;

said regional buffer including means for recognizing said start signal;

a computer buffer having a plurality of high speed line inputs and outputs and a computer input and output for connection to said computer; and means for connecting said regional buffer to the corresponding input and output of said computer buffer for transmitting inquiries to said computer buffer and messages to said regional buffer.

18. In a market quotation apparatus, the combination of:

a memory unit including means for storing market information therein;

a computer including means for looking up stored information in said memory unit and composing a message in response to an inquiry, said inquiry including an identification section and a function section;

a customer unit having an output and an input and means for generating an inquiry and means for displaying a message;

a regional buffer having a plurality of customer inputs and outputs and a high speed line input and output;

means for connecting said customer unit output and input in parallel with additional customer unit outputs and inputs to the corresponding input and output of said regional buffer for transmitting inquiries to said regional buffer and messages to said customer unit;

said customer unit including manually actuable means for generating in a digital code characters comprising an inquiry, a first multibit storage unit for storing characters of an inquiry, a second multibit storage unit for storing characters of a message, first transfer means for transferring a character bit by bit from said first storage unit to said customer unit output and to said second storage unit, and second transfer means for transferring a character from said second storage unit to said means for displaying a message;

a computer buffer having a plurality of high speed line inputs and outputs and a computer input and output for connection to said computer; and means for connecting said regional buffer to the corresponding input and output of said computer buffer for transmitting inquires to said computer buffer and messages to said regional buffer.

19. In a market quotation apparatus, the combination of:

a memory unit including means for storing market information therein;

a computer including means for looking up stored information in said memory unit and composing a message in response to an inquiry, said inquiry including an identification section and a function section;

a customer unit having an output and an input, means for generating an inquiry, and display means for displaying a message;

a regional buffer having a plurality of customer inputs and outputs and a high speed line input and output;

means for connecting said customer unit output and input in parallel with additional customer unit outputs and inputs to the corresponding input and output of said regional buffer for transmitting inquiries to said regional buffer and messages to said customer unit;

said customer unit including a receive storage unit for receiving and storing message characters from said customer unit input, each message character comprising $m$ bits, a display means storage unit for storing $n$ bits, $n$ being greater than $m$, to provide an input for said display means, said display means being actuated by $n$ bit character codes, means for generating first and second shift digital codes each of $n-m$ bits, detector means having said message characters as an input for detecting a first shift character and a second shift character, means for transferring message characters from said receive storage unit to said display means storage unit, and means for transferring said first shift digital code to said display means storage unit for each message character transferred after a first shift character is received and transferring said second shift digital code for each message character transferred after a second shift character is received;

a computer buffer having a plurality of high speed line inputs and outputs and a computer input and output for connection to said computer; and means for connecting said regional buffer to the corresponding input and output of said computer buffer for transmitting inquiries to said computer buffer and messages to said regional buffer.

References Cited by the Examiner

UNITED STATES PATENTS

| | | | |
|---|---|---|---|
| 3,124,674 | 3/1964 | Edwards et al. | 340—174.5 |
| 3,133,268 | 5/1964 | Avakian et al. | 340—172.5 |
| 3,245,043 | 4/1966 | Gaffney et al. | 340—172.5 |

ROBERT C. BAILEY, *Primary Examiner.*

P. L. BERGER, *Assistant Examiner.*